United States Patent [19]

Dorr et al.

[11] Patent Number: 5,782,573
[45] Date of Patent: Jul. 21, 1998

[54] BALL-AND-SOCKET JOINT WITH BALL RETENTION DEVICE

[75] Inventors: Christoph Dorr, Meerbusch; Hans-Joachim Schutt, Bergheim, both of Germany

[73] Assignee: TRW Fahrwerksysteme GmbH & Co. KG, Dusseldorf, Germany

[21] Appl. No.: 596,258

[22] PCT Filed: Jun. 19, 1995

[86] PCT No.: PCT/EP95/02355

§ 371 Date: Aug. 23, 1996

§ 102(e) Date: Aug. 23, 1996

[87] PCT Pub. No.: WO95/35450

PCT Pub. Date: Dec. 28, 1995

[30] Foreign Application Priority Data

Jun. 18, 1994 [DE] Germany .................. 44 21 403.0

[51] Int. Cl.⁶ ........................................ F16C 11/00
[52] U.S. Cl. ........................ 403/135; 403/144; 403/132
[58] Field of Search .................... 403/135, 133, 403/144, 122, 132

[56] References Cited

U.S. PATENT DOCUMENTS

| | | |
|---|---|---|
| 3,497,247 | 2/1970 | Fister et al. |
| 3,787,129 | 1/1974 | Kohler et al. ............... 403/135 |
| 3,909,084 | 9/1975 | Snidar et al. ............... 403/135 X |
| 4,118,131 | 10/1978 | Schnitzius . |
| 4,318,627 | 3/1982 | Morin ....................... 403/133 |
| 4,714,368 | 12/1987 | Sawada et al. .............. 403/132 |
| 4,993,863 | 2/1991 | Inoue ........................ 403/133 |
| 5,152,628 | 10/1992 | Broszat et al. .............. 403/135 X |
| 5,395,176 | 3/1995 | Zivkovic .................... 403/135 X |

FOREIGN PATENT DOCUMENTS

| | | |
|---|---|---|
| 1292538 | 3/1962 | France . |
| 2471510 | 6/1981 | France . |
| 8420718 | 10/1984 | Germany . |
| 4211897 | 10/1993 | Germany . |
| 982885 | 2/1965 | United Kingdom . |

*Primary Examiner*—Kenneth J. Dorner
*Assistant Examiner*—William L. Miller
*Attorney, Agent, or Firm*—Tarolli, Sundheim, Covell, Tummino & Szabo

[57] ABSTRACT

A ball-and-socket joint includes a journal (1) having a ball (2) on one end. A plastic housing (3) has a socket and an opening through which the ball (2) is inserted into the socket. The socket is defined by a plurality of circumferentially spaced segmented bearing surfaces (3b) having a partially spherical shape and being formed by a plurality of circumferentially spaced radially extending slits (3a). The plurality of slits (3a) extend axially from the opening to at least an equator (3e) of said socket. The housing (3) includes a ring groove (3f) extending axially from the opening to at least the equator (3e). The ring groove (3f) encircles the plurality of segmented bearing surfaces (3b). A locking ring (4) is in the ring groove (3f) in the housing (3). The locking ring (4) elastically deforms the plurality of segmented bearing surfaces (3b) to position the ball (2) in a first position in the socket against the plurality of segmented bearing surfaces (3b).

5 Claims, 5 Drawing Sheets

BALL-AND-SOCKET JOINT WITH BALL RETENTION DEVICE

BACKGROUND OF THE INVENTION

The invention pertains to a ball-and-socket joint with the ball of the joint fashioned on a journal and a housing, preferably made of plastic, in which the ball of the joint is installed directly so as to be capable of rotation and tilting.

Such ball-and-socket joints with the ball of the joint installed directly in the housing are known.

The fundamental objective of the invention is to refine these ball-and-socket joints in such a way that, with the simplest design of the housing and a minimal number of individual parts, a secure and easily assembled installation of the ball of the joint in the housing results.

SUMMARY OF THE INVENTION

The realization of this objective in accordance with the invention is characterized in that numerous bearing surfaces in the form of segments of a sphere are formed in the housing by slits running in the radial direction and extending axially from the opening of the housing at least to the equator of the spherical bearing surface, which are elastically deformable by means of an ring groove encircling them in their part extending from the opening of the housing approximately to the equator for retaining the ball of the joint and can be fixed in their position, ensuring the proper positioning of the ball of the joint in the housing by a locking ring insertable into the ring groove to ensure said proper positioning of the ball of the joint.

By virtue of the slits extending axially from the opening of the housing at least to the equator of he spherical bearing surface, the depth of which runs in the radial direction, the spherical bearing surface is divided into a number of individual bearing surfaces, which are curved to match the surface of the ball of the joint and have an approximately trapezoidal surface form in projection. The ball of the joint is in direct contact with these bearing surfaces.

Since the diameter represented by the combined individual bearing surfaces is smaller in the area of the opening of the housing than that of the ball of the joint to be inserted into the housing, said individual bearing surfaces are elastically deformable in their part preferably extending from the opening of the housing to the equator by means of an ring groove radially encircling them on the face of the opening of the housing, so that the ball of the joint can be fitted into the one-piece housing by utilizing the elasticity of these parts of the individual bearing surfaces.

In order that the ball of the joint is dependably retained inside the housing following its insertion, a locking ring is inserted into the ring groove, which fixes the elastically deformable individual bearing surfaces in place so as to ensure the proper positioning of the ball of the joint in the housing, i.e., it eliminates the elastic deformability of the parts of the individual bearing surfaces between the opening of the housing and the equator.

This locking ring is secured in the ring groove against dislodgement from the housing by clamping action or an appropriately structured jacket surface, e.g., knurled or denticulated.

According to a further characteristic of the invention, the locking ring is provided with an extension which, following its installation, protrudes out of the ring groove of the housing and forms an ring groove for securing the housing-side rim of the sealing boot with the aid of an attachment ring.

In one refinement of the joint in keeping with the invention, the extension of the locking ring, preferably made of a metallic material, protruding out from the ring groove of the housing following its installation is plastically deformed radially, for example, rolled or pressed, so that it clamps and thus secures the housing-side rim of the sealing boot between itself and the inner cylindrical jacket surface of the ring groove extending toward the opening of the housing.

All together, the refinement of the known ball-and-socket joints according to the invention results in a constructively simple ball-and-socket joint with a one-piece housing, the bearing surface of which is divided into individual, partially elastically deformable bearing surfaces, the elasticity of which is eliminated by a locking ring after the ball of the joint has been installed. The result is a so-called snap joint with few parts, which can be installed especially simply.

In order to secure the locking ring dependably in the ring groove of the housing, it is provided, in keeping with another characteristic of the invention, with lands running in the slits of the housing and encompassing the ball of the joint. By virtue of the design of these lands encompassing the ball of the joint, the locking ring is inserted into the housing along with the ball of the joint, whereupon it automatically eliminates the elasticity of the individual bearing surfaces developed in the housing as soon as the ball of the joint has reached its final position inside the housing. Since the lands encompass the ball of the joint, the locking ring is automatically secured against dislodgement from the ring groove formed in the housing.

When a sealing boot is to be provided between the housing and the journal of the ball of the joint, it is proposed in keeping with the invention that the locking ring be designed with an extension provided with an axial, ring groove for receiving the housing-side rim of a sealing boot. By inserting the housing-side rim of the sealing boot into the receiving groove provided on the locking ring for this purpose, the housing-side rim of the sealing boot is simultaneously affixed to the housing when the ball of the joint and the locking ring are installed and without any need for additional operations or parts. Furthermore, by virtue of this refinement according to the invention, the attachment of the sealing boot to the housing is accomplished with very little stress on the material of the boot and there results a clean unrolling of the sealing boot during tilting movements of the ball journal.

Illustrated in the drawings are embodiment examples of the ball-and-socket joint of the invention; depicted are:

DESCRIPTION OF THE PREFERRED EMBODIMENTS

The ball-and-socket joint illustrated in three embodiment examples encompasses the ball (2) of the joint fashioned on a journal (1) and a housing (3) made of plastic, in which the ball (2) of the joint is directly installed so as to be capable of rotation and tilting.

Figure 3:
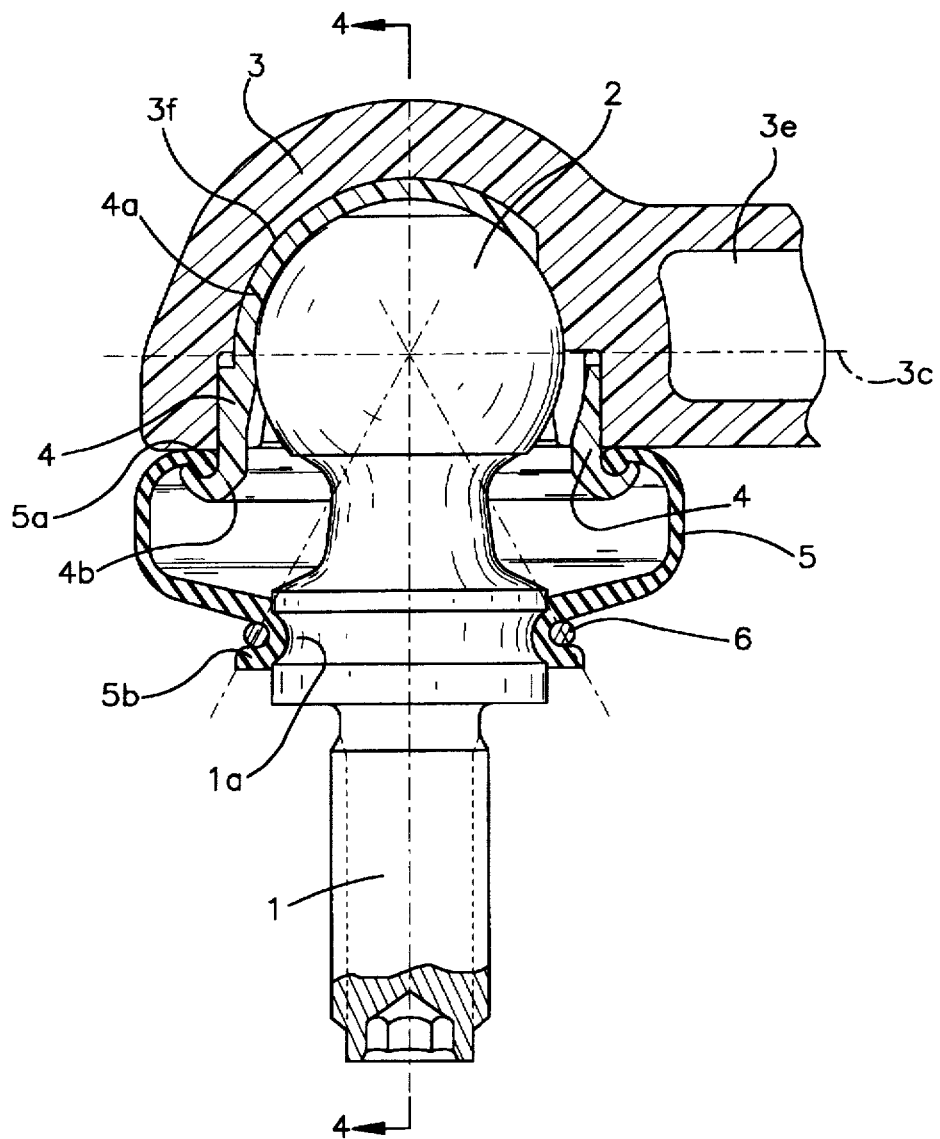
FIG. 3, a longitudinal section through a third embodiment example of the ball-and-socket joint.
Figure 4:
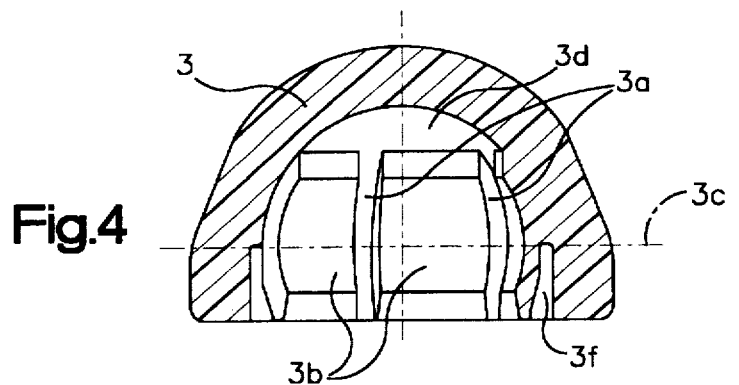
FIG. 4, a cross section through the housing along the line IV—IV in FIG. 3.
Figure 5:
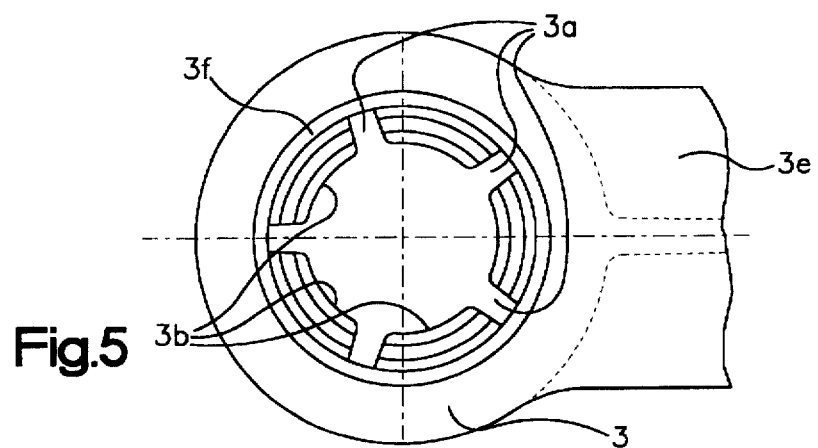
FIG. 5, a view of the housing in FIG. 4 as seen from the opening of the housing.
Figure 6:
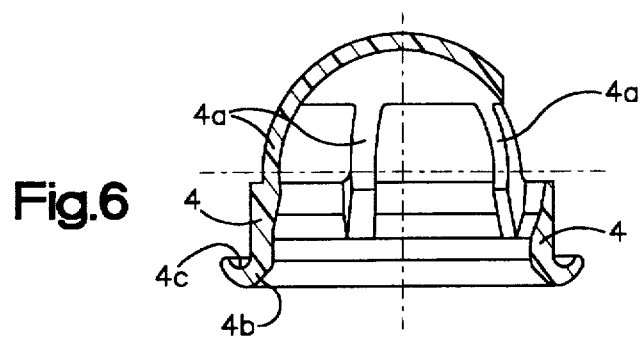
FIG. 6, a section through the locking ring in FIG. 3 provided with lands.
Figure 7:
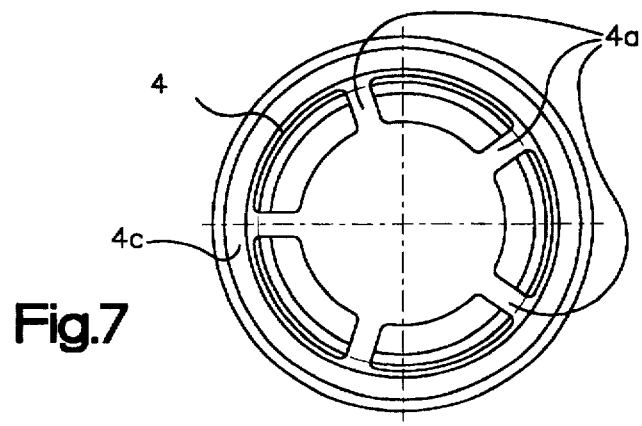
FIG. 7, a top view of the locking ring in FIG. 6.
Figure 8:
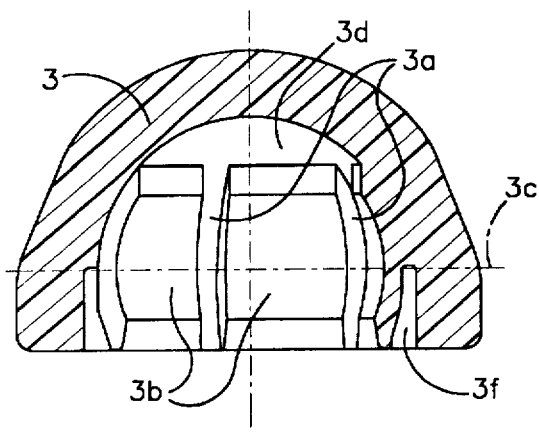
FIG. 8, a cutaway illustration of the ball-and-socket joint in FIG. 3 following partial installation.
Figure 8:
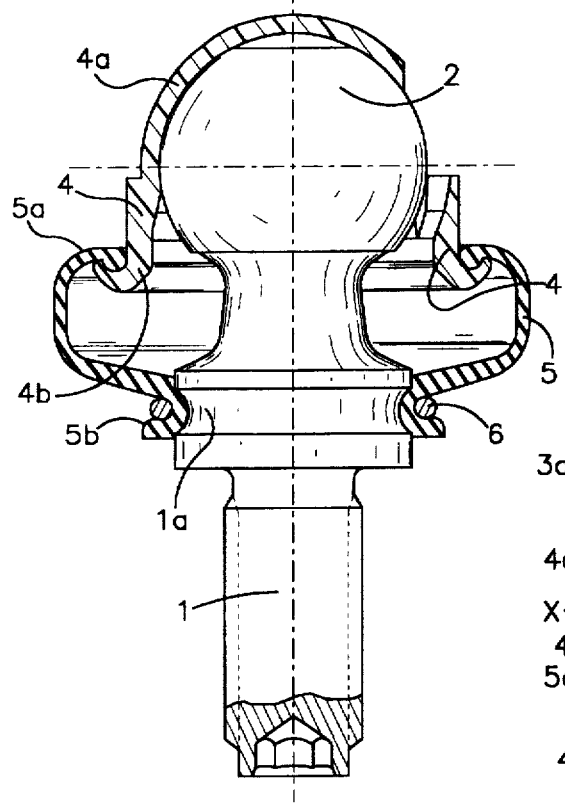
Figure 9:
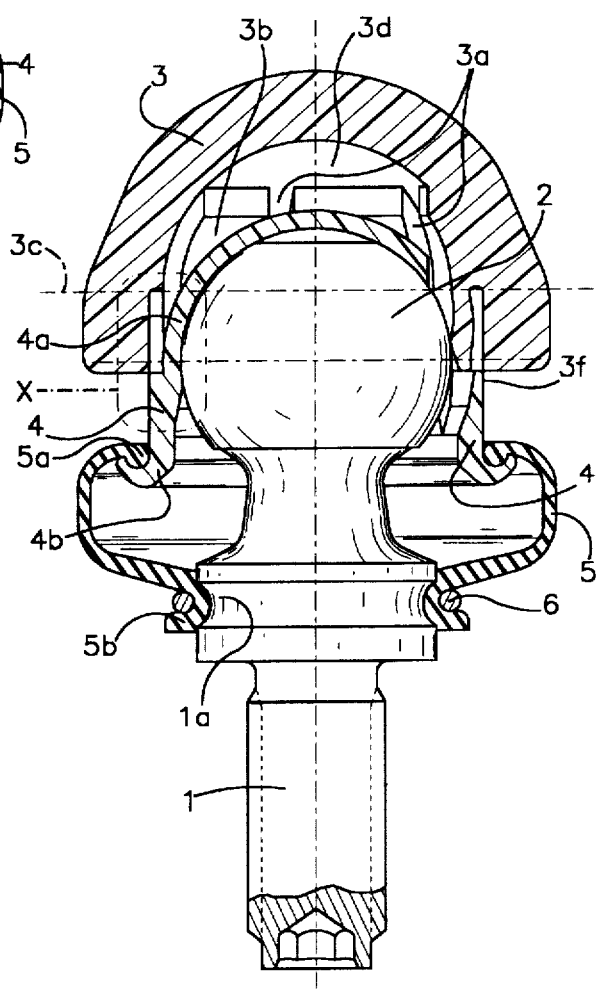
FIG. 9, a further cutaway illustration as in FIG. 8 during the final installation step, and FIG. 10, a total of eight cutaway illustrations showing the assembly operation during the insertion of the locking ring into the ring groove of the housing in the area marked with an "X"0 in FIG. 9.
Figure 10A:
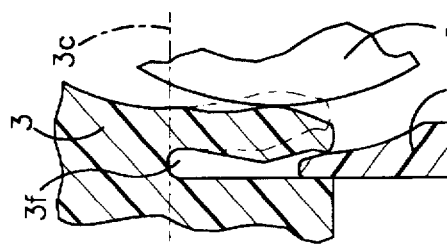
Figure 10B:
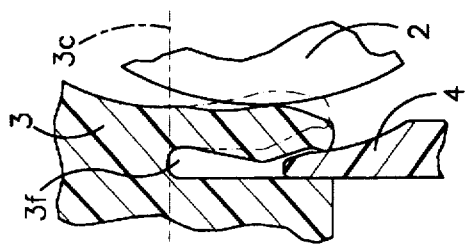
Figure 10C:
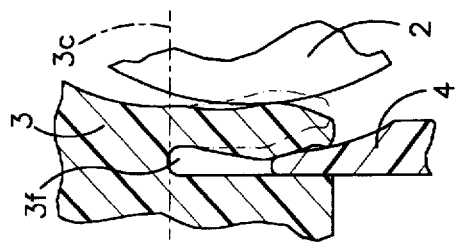
Figure 10D:
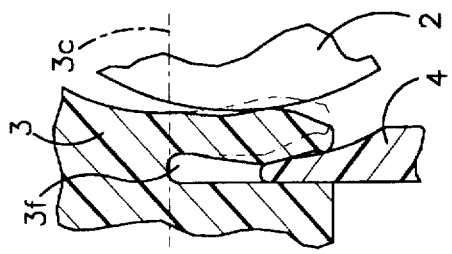
Figure 10E:
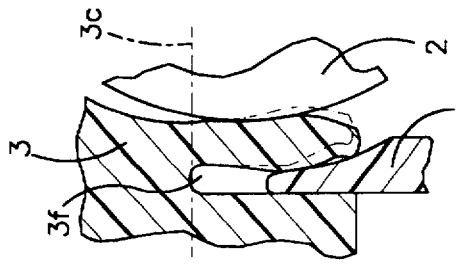
Figure 10F:
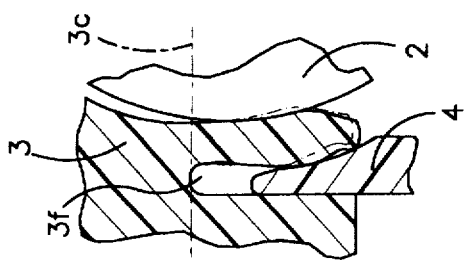
Figure 10G:
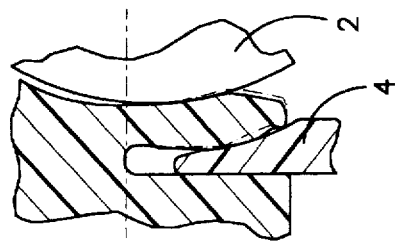
Figure 10H:
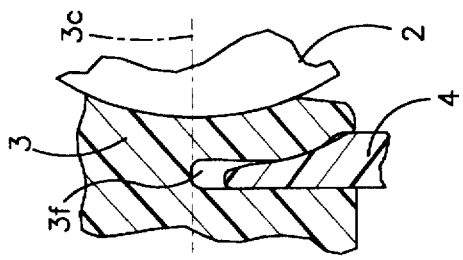

The originally spherical bearing surface of this housing (3) is divided by slits (3a) into a number of bearing surfaces (3b) in the form of segments of a sphere. The slits (3a), formed by radially oriented impressions, extend from the opening of the housing (3) to at least the equator of the bearing surface. In the embodiment example depicted in FIG. 3, they extend well beyond the equator (3c), indicated, e.g., by the broken line in FIG. 4, and open into a spherically cupped cavity (3d). As can be seen in FIGS. 3 and 5, the housing (3) in this embodiment example is formed at the end of a strut (3e).

In the area of the front surface surrounding the housing (3) a ring groove (3f) preferably extending to the equator (3c) is formed in the housing (3). Due to this ring groove (3f), the parts of the bearing surfaces (3b) between the equator (3c) and the opening acquire so much elasticity that the ball (2) of the ball-and-socket joint, while spreading apart the affected parts of the bearing surfaces (3b), can be forced into the housing (3). In order to secure the ball (2) of the joint in this position inside the housing (3), a locking ring (4) is fitted into the ring groove (3f) of the housing (3) once the ball (2) of the joint has been inserted into the housing (3), which ring then eliminates the elasticity of the parts of the bearing surfaces (3b) lying between the equator (3c) and the opening of the housing (3).

Figure 1:
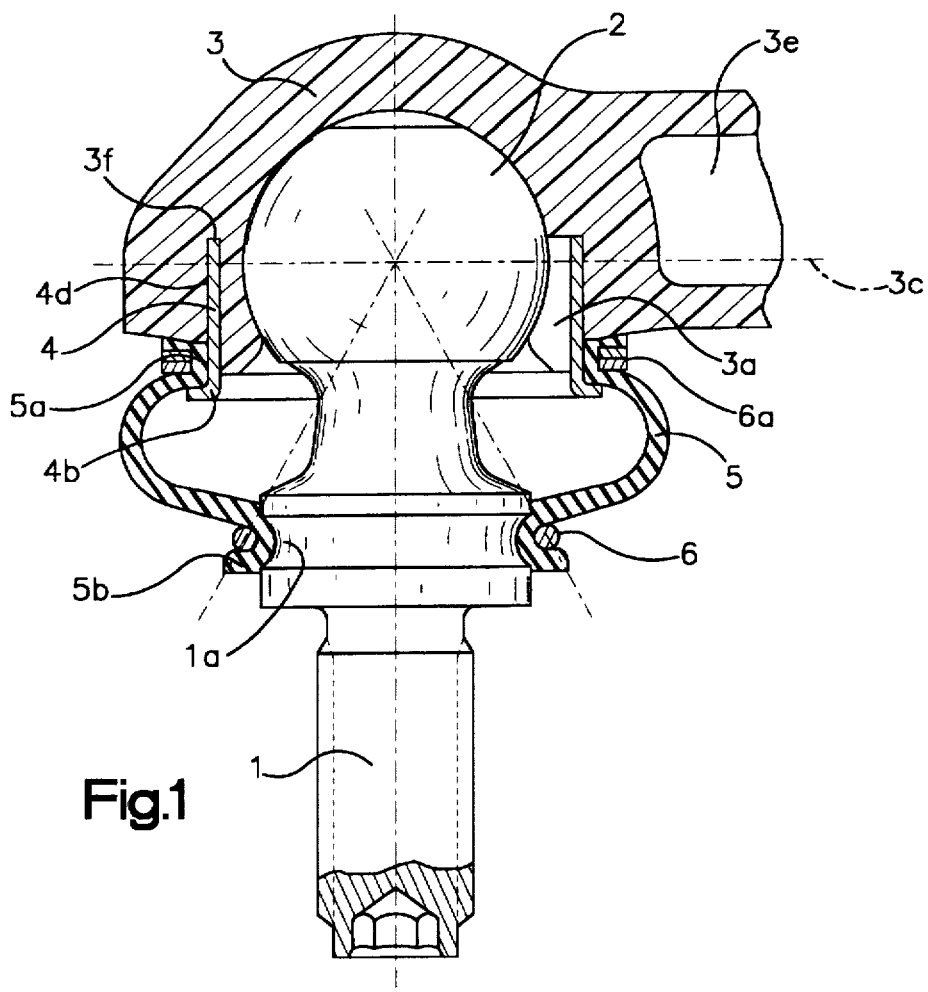
FIG. 1, a longitudinal section through a first embodiment example of the ball-and-socket joint.
Figure 2:
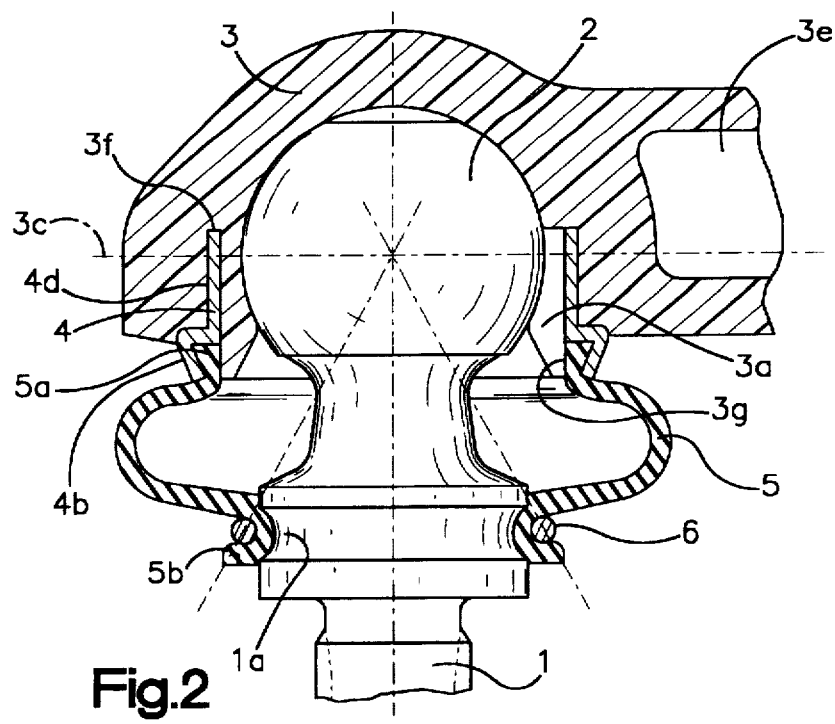
FIG. 2, a longitudinal section through a second embodiment example of the ball-and-socket joint.

In order to hold this locking ring (4) dependably in its position securing the ball (2) of the joint in the housing (3), it is provided, in the embodiment examples depicted in FIGS. 1 and 2, with a knurling of its cylindrical outer jacket surface. In the embodiment example depicted in FIG. 3, on the other hand, it is provided with lands (4a) running into the slits (3a) of the housing (3) and encompassing the ball (2) of the joint. These lands (4a), formed in one piece with the locking ring (4), secure the locking ring (4) against dislodgement from the ring groove (3f). With appropriate configuration, a positive fit is achieved, as best depicted in FIG. 10, which illustrates in the manner of a photographic sequence the fitting of the locking ring (4) into the ring groove (3f) in conjunction with the insertion of the ball (2) of the joint into the housing (3).

Since the opening of the housing of the ball-and-socket joint is normally enclosed in a sealing boot (5), which is fastened at one of its openings to the housing (3) and at its other opening in a groove (1a) on the journal (1), the locking ring (4) is provided with an extension (4b). In the embodiment example in FIG. 1, this extension (4b) protrudes from the ring groove (3f) of the housing (3) following its installation and forms a ring groove which serves to secure the housing-side rim (5a) of the sealing boot (5) with the aid of an attachment ring (6a). In the embodiment example in FIG. 2, on the other hand, the extension (4b) of the locking ring (4) protruding out of the ring groove (3f) of the housing (3) after its installation, which is preferably made of a metallic material, is plastically deformed radially so that it clamps and secures the housing-side rim (5a) of the sealing boot (5) between itself and the inner cylindrical jacket surface (3g) of the ring groove (3f). Finally, in the case of the embodiment example in FIG. 3, the locking ring (4) is preferably made of plastic and provided with an extension (4b), in which a ring-shaped receiving groove (4c) is formed. This receiving groove (4c) accepts the housing-side rim (5a) of the sealing boot (5), which is clamped in this manner between the extension, (4b) of the locking ring (4) and the face of the housing (3) and fastened to the housing (3) together with the locking ring (4). The journal-side rim (5b) of the sealing boot (5) in all three embodiment examples is fastened in a known manner by a locking ring (6) in the area of the groove (1a) on the journal (1).

By virtue of the design of the housing (3) described above, the necessary elasticity of the bearing surfaces (3b) is produced in a simple manner in each case so as to make it possible for the ball (2) of the joint to be inserted into the housing (3) without any danger of damaging the bearing surfaces. The locking ring (4) for insertion into the ring groove (3f) of the housing (3) serves not only to secure the positioning of the ball (2) of the joint inside the housing (3) but also, by virtue of the design of the extension (4b) to affix the housing-side rim (5a) of the sealing boot (5) on the housing (3). In the embodiment example in FIG. 3, the lands (4a) formed on the locking ring (4) ensure that the locking ring (4) cannot be inadvertently dislodged from the ring groove (3f) of the housing (3).

List of reference numbers

1 Journal
1a Groove
2 Ball of the joint
3 Housing
3a Slit
3b Bearing surface
3c Equator
3d Cavity
3e Strut
3f Ring groove
3g Cylindrical jacket surface
4 Locking ring
4a Land
4b Extension
4c Receiving groove
4d Structured jacket surface
5 Sealing boot
5a Housing-side rim
5b Journal-side rim
6 Attachment ring
6a Attachment ring

We claim:

1. A ball-and-socket joint comprising:

a journal (1) having a ball (2) on one end;

a plastic housing (3) having a socket and an opening through which said ball (2) is inserted into said socket, said socket being defined by a plurality of circumferentially spaced segmented bearing surfaces (3b) having a partially spherical shape, said plurality of segmented bearing surfaces (3b) being formed by a plurality of circumferentially spaced radially extending slits (3a), said plurality of slits (3a) extending axially from said opening to at least an equator (3e) of said socket, said housing (3) including a ring groove (3f) extending axially from said opening to at least said equator (3e), said ring groove (3f) encircling said plurality of segmented bearing surfaces (3b) defining said socket in said housing (3), and a locking ring (4) in said ring groove (3f) in said housing (3), said locking ring (4) elastically deforming said plurality of segmented bearing surfaces (3b) to position said ball (2) in a first position in said socket against said plurality of segmented bearing surfaces (3b), said locking ring (4) having a plurality of circumferentially spaced radially extending lands (4a) encircling said ball (2), each one of said plurality of lands (4a) extending into a respective one of said plurality of slits (3a) in said housing (3) to secure said ball (2) in said first position in said socket.

2. A ball-and-socket joint according to claim 1 wherein said locking ring (4) has an extension (4b) which secures a housing-side rim (5a) of a sealing boot (5) with the aid of an attachment ring (6a).

3. A ball-and-socket joint according to claim 1 wherein said locking ring (4) is made of a plastic material and has an extension (4b) which, by way of radial plastic deformation of said extension (4b), secures a housing-side rim (5a) of a sealing boot (5) by clamping said housing-side rim (5a) between said extension (4b) and an inner cylindrical jacket surface (3g) of said ring groove (3f) which extends to said opening in said housing (3).

4. A ball-and-socket joint according to claim 1 wherein said locking ring (4) is made of plastic.

5. A ball-and-socket joint according to claim 1 wherein said locking ring (4) has an extension (4b) with a ring-shaped receiving groove (4c) for receiving a housing-side rim (5a) of a sealing boot (5).

* * * * *